Sept. 10, 1940.    H. S. AUSHERMAN ET AL    2,214,396
AGRICULTURAL MACHINE
Filed Feb. 20, 1939    3 Sheets-Sheet 1
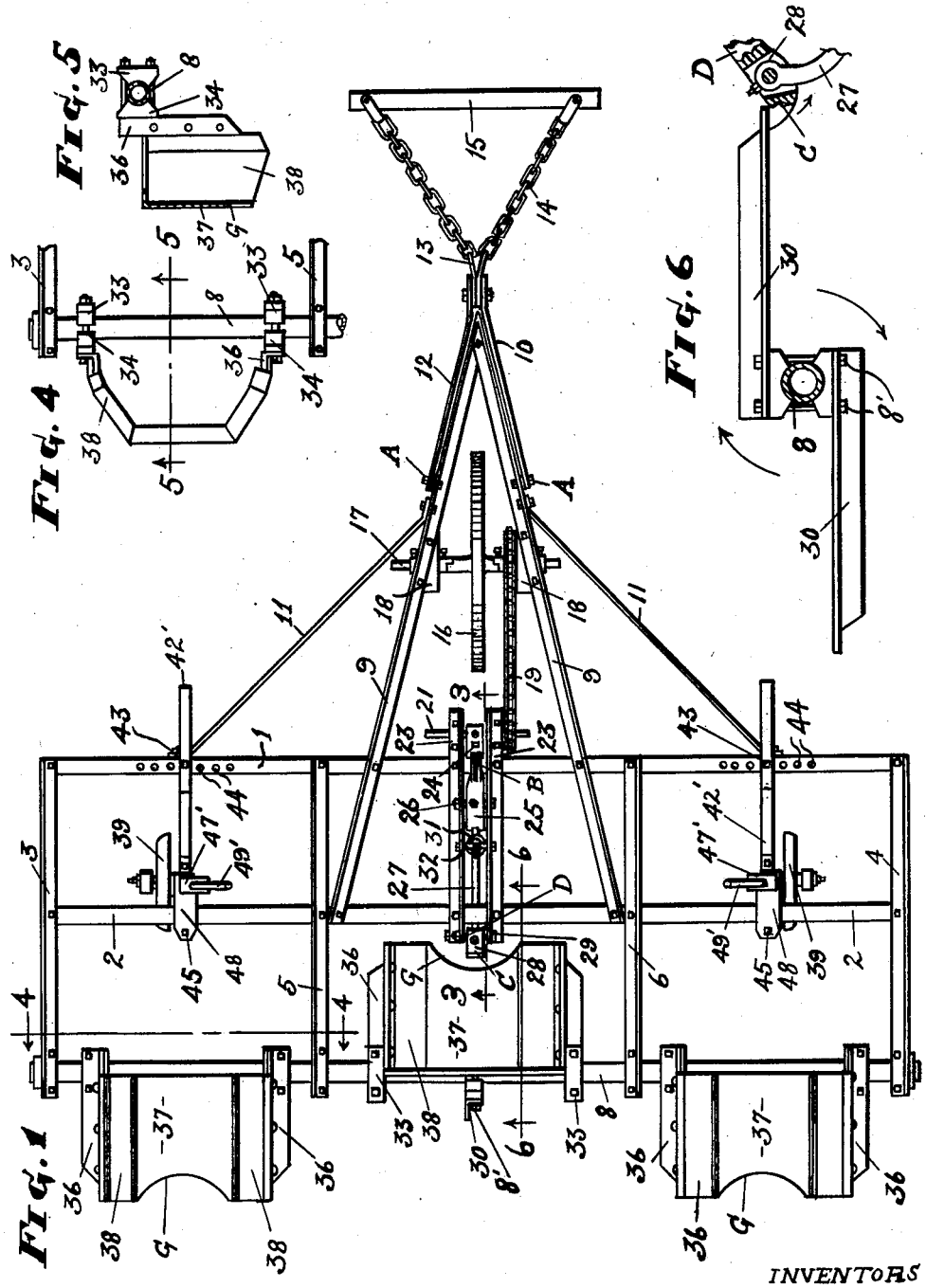
INVENTORS
H. S. AUSHERMAN
W. S. AUSHERMAN
BY W.S. Charles
ATTORNEY.

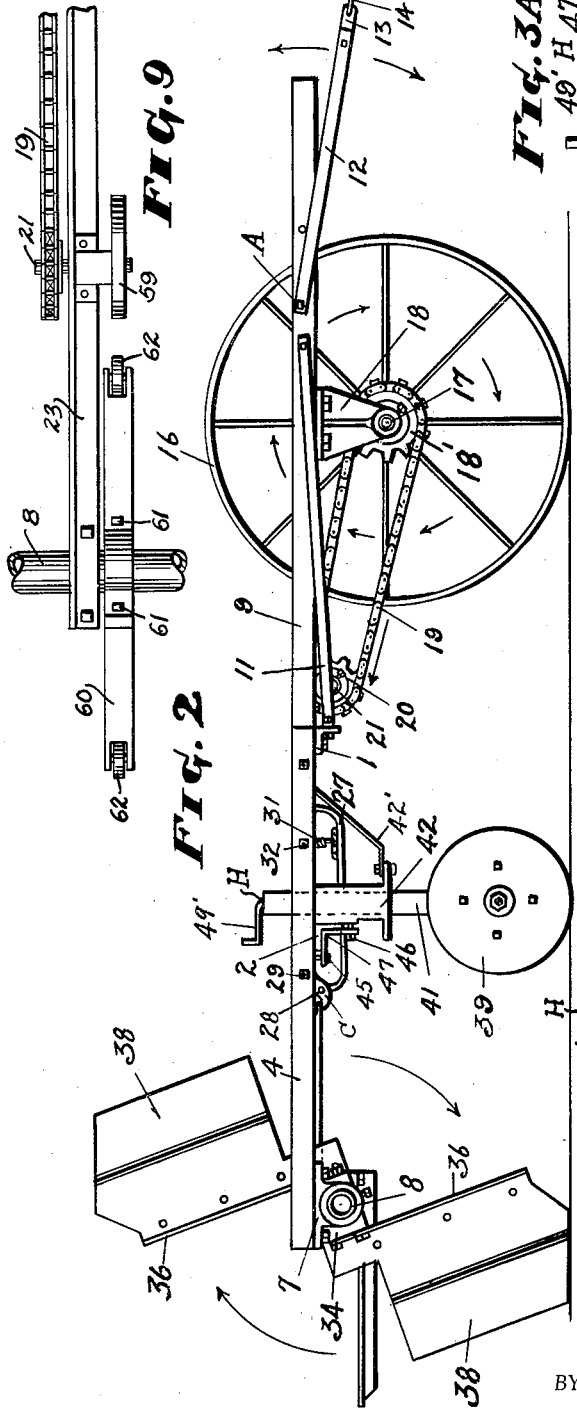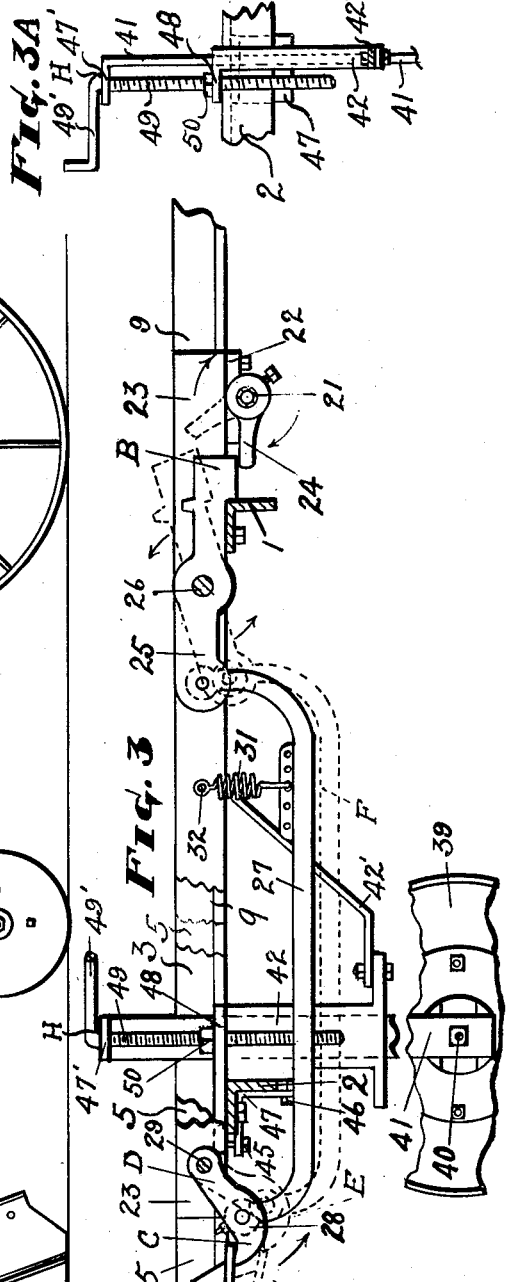

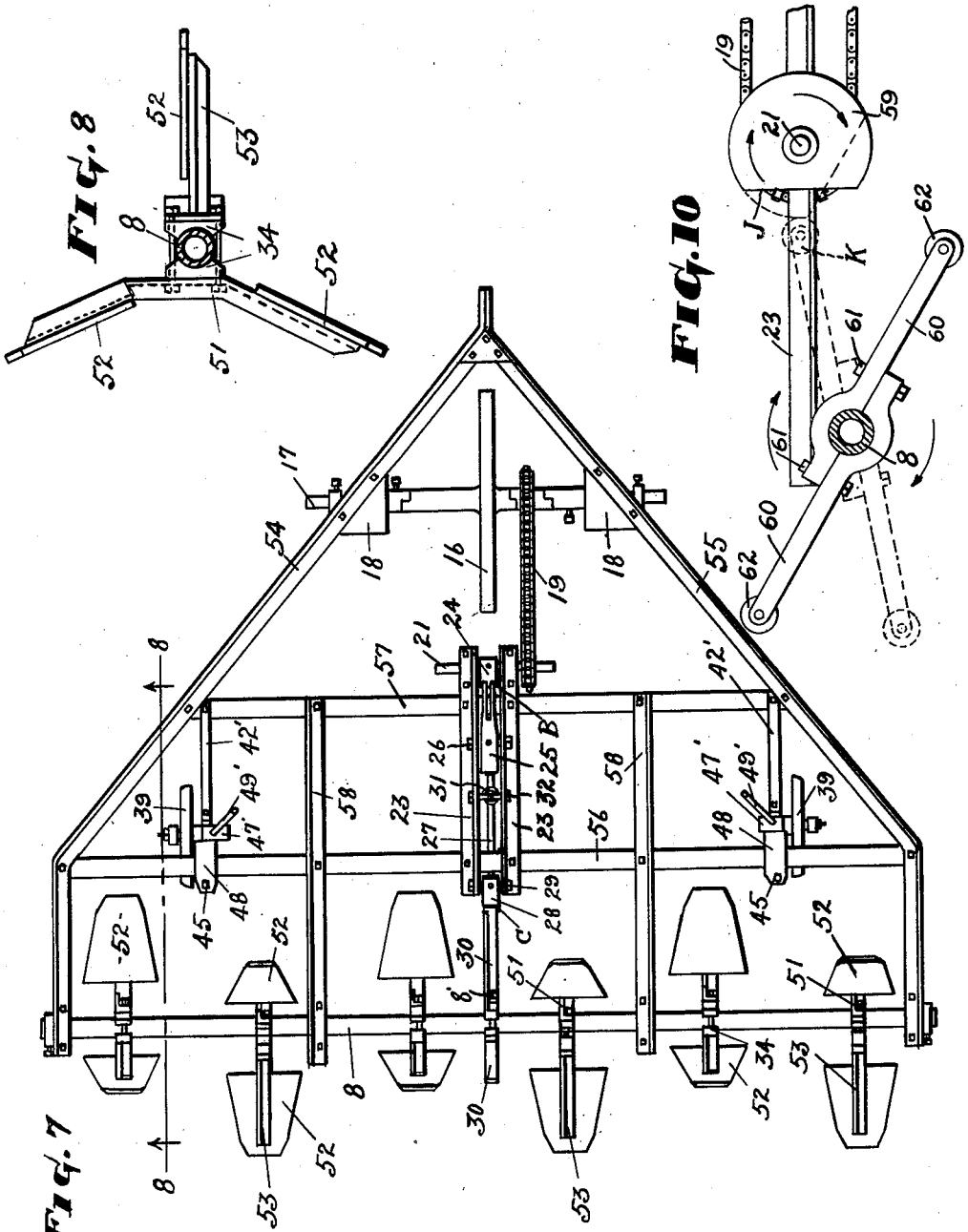

Patented Sept. 10, 1940

2,214,396

UNITED STATES PATENT OFFICE 2,214,396

AGRICULTURAL MACHINE

Harry S. Ausherman and William S. Ausherman, Abilene, Kans.

Application February 20, 1939, Serial No. 257,472

2 Claims. (Cl. 97—55)

This invention relates to agricultural machines, and more particularly to a machine designed for use in forming spaced dams throughout the lengths of lister furrows, so that water will be trapped in the furrows to be absorbed by the soil, for conservation purposes.

Another object of the invention is to provide means for protecting the water held within the furrows, against the wind passing along the furrows, thereby eliminating wind erosion; furthermore, the machine will function on newly broken ground prior to seeding the same whereby series of depressions will be formed to receive water at the time of rainfall; being so operated, will avoid undue drainage should the ground slope in any direction.

A still further object of our invention is to provide a machine that will form depressions in staggered relation to each other to uniformly distribute pools of water obtained thereby throughout the area of the field.

A still further object of our invention is the provision of a machine embodying scoops adapted to move along the furrows, scooping up material and depositing the same at predetermined distances throughout the lengths of the furrows, thereby forming dams throughout the lengths of the furrows, the machine being automatically operated, relieving the operator of the necessity of manually tripping the dam-forming means.

These and other objects will hereinafter be more fully explained, reference being had to the accompanying drawings forming a part of the specification, in which like characters will apply to like parts in the different views.

Referring to the drawings:

Fig. 1 is a plan view of the machine.

Fig. 2 is an enlarged side elevation of Fig. 1.

Fig. 3 is an enlarged fragmentary view of the tripping mechanism for the scoops.

Fig. 3A is a front view of the left hand support for the rear of the frame.

Fig. 4 is a plan view of one of the scoops vertically positioned and carrying means therefor.

Fig. 5 is a sectional view taken on line 5—5 in Fig. 4.

Fig. 6 is an enlarged side view of the tripping arms and detent therefor, taken on line 6—6 in Fig. 1.

Fig. 7 is a plan view of a machine modified with respect to the frame and scoops.

Fig. 8 is an enlarged side view of the tripping scoops.

Fig. 9 is a plan view of a tripping mechanism for the scoops, modified.

Fig. 10 is a side view of Fig. 9.

Referring to the drawings in detail, attention is directed to Fig. 1, the form of which is preferred and consists of a frame substantially rectangular in form composed of bars 1 and 2 spaced apart in parallelism, the ends thereof being connected with their respective side bars 3 and 4, and a pair of bars 5 and 6 intermediately positioned, spaced apart and extending rearward, the outer ends of which align with bars 3 and 4, to all of which bearings 7 are attached to the underside and near the outer ends of each as carrying means for a shaft 8 trunnioned therein, the purpose of which will be later described.

As a means to convey said frame, there is provided a pair of bars 9, medially of the frame, converging outward toward the front and being connected where they intersect, by a bolt 10, and the said bars having lateral brace rods 11, one end of each being secured to the frame while the other ends are secured to said bars 9.

Pivotally mounted as at A is a hitch frame 12 to which the ears 13 are connected, to which chains 14 are connected, said chains being connected with the hitch bar 15 in such a way as to form continuation of the bars 9.

Positioned between said bars 9 adjacent their forward end is a supporting wheel 16, the axle 17 of which is trunnioned in suitable bearings 18 that are secured to the under side of their respective bar or bars 9. The said axle 17 has secured thereto a sprocket wheel 18' over which a chain 19 operates, said chain likewise operating over the sprocket 20 that is mounted on a shaft 21 that is trunnioned in bearings 22 at the underside of the forward projecting ends of bars 23, that are spaced apart and secured to the rectangular frame bars 1 and 2 transversely crossing the same.

Between said bars 23 and being secured to shaft 21 is an outwardly extending lug 24 rotatable with said shaft that acts upon the free end B of an arm 25 that is rockably pivoted to said bars 23 through the medium of a rod 26 that extends through said arm medially of its length, the said free end of said arm normally resting on bar 1. The other end of said rockable arm 25 pivotally carries its respective end of a link 27, while the other end of the link is pivotally connected to the head C of a pawl 28, the shank D of which is pivoted on a shaft 29, the ends of which have their bearings on said bars 23 to permit rocking movement of the pawl, the head of which functions as a detent for a pair of arms 30, secured to shaft 8 by bolts 8' and rotatable with the shaft; the ends of said arms are adapted to rest on the head of the pawl momentarily and alternately by movement of the pawl to a position shown by dotted lines E, said movement actuated by the forward pull of said link to a position shown by dotted lines F, the forward and downward movement of which is actuated by the rocking movement of said arm 25 that is actuated by lug 24 in its rotation, and at the moment of its release from the free end of said arm 25, the same is rocked to its normal resting place by the tension of a spring 31, one end of which is secured to the said link while the other end is secured to a rod 32 that is carried by said bars 23.

It will now be seen that the movement of the pawl is governed by the rotation of said carrying wheel 16, the purpose of which is to control the action of scoops later described, said scoops being secured rigid to said shaft 8 through a pair of jaws 33 and 34 tensioned toward each other by bolts 35, and the said jaw 34 is connected to the scoops by a bar 36 secured to the side of the scoop, and to said jaw, there being a similar jaw and a bar for the other side of said scoop, by which means the extension of the scoops spaced along the shaft may be oppositely extended therefrom for alternate engagement with the ground, and being detained momentarily against rotation with the shaft, is means to elongate the depressions formed thereby as the machine moves forward.

The said scoops each have a bottom 37 and side walls 38, the cutting edge of the bottom having an arcuate inner cut G to maintain loose dirt as a mulch when the scoop engages in lister furrows, and, furthermore, to avoid contact with grain as planted by the lister which rests at the bottom of the furrow, and the furrow may be dammed at intervals to avoid excess washing in the case of a sloping field.

As a carrying means for the rectangular portion of the frame, we have provided a wheel 39, positioned a spaced distance from each end of said frame, said wheel being trunnioned on a bolt 40 transversely extending from and being secured to a shank 41 that is rectangular in cross section and adapted to slide in a guide element 42, having an opening therethrough to conform to the shank, the said guide element being carried by bar 2, extending downward therefrom and having a brace 42' secured to the lower end, the other end of said brace being secured to bar 1 by bolt 43, engaging in apertures 44, selectively, that are spaced along said bar, by which means the shank guide element may be moved longitudinally along bar 2 and secured thereto by bolts 45 and 46 that engage through the ends of an L-shaped clamp 47, it being understood that bolt 46 threadedly engages in the side of said shank guide, while bolt 45 extends upward through the ends of a lip 48 that is integrally joined to said guide element and adapted to rest on the upper side of bar 2 slidably therealong and clamped at a selected point as above stated.

To vary the cutting depth of the scoops and as a means to raise said scoops from engagement, we have provided a vertical adjustment for the shanks of said wheels through the medium of a screw 49 passing downward and through an aperture in a right angle portion 47' at the upper end of said shank, from thence threadedly engaging in a threaded aperture in the lip of said guide as shown in Fig. 3A, and the said screw has a crank 49' at the upper end thereof, the hub H of which seats on said right angle portion of the shank as carrying means for the said rectangular frame at a desired position from the ground; when so positioned the screw is locked by a nut 50 threadedly engaging thereon by tensioning the nut to snug engagement on the lip.

Figs. 7 and 8 show a modified form for the frame and scoops, the latter being applied to said frame but not confined to such alone, as scoops heretofore described may be employed. However, last said scoop arrangement consists of separable jaws similar to that described for the first said scoops that are clamped together by bolts for snug engagement on shaft 8. One of said jaws has a shank 51 connected thereto medially of the length of the shank and the outer portions thereof are positioned obliquely outward and having a flat straight scoop 52 secured to each, the peripheral contour of which consists of end portions in parallelism, while the side edge portions converge to the outer end thereof with respect to its position on the shank, and a third similar scoop with a straight shank 53, and means to connect the same securely to the other jaw, whereby the said scoops are positioned substantially on an angle of 120 degrees from each other, the arrangement of which is preferred to closely depress a level tract of ground prior to seeding the same.

The frame shown in Fig. 7 as modified in substantially triangular in form, the contour members of which are indicated by numerals 54, 55, and 56, and a bar 57 medially crossing the frame transverse to its line of travel, the ends of which connect to bars 54 and 55 respectively, and said bars 54 and 55, where they connect to bar 56, extend rearward, and being in parallelism with each other, so that the outer ends thereof have appropriate bearings in which said shaft 8 is trunnioned, and the said shaft has a pair of suitable bearings intermediate of its ends, each of which are carried by bars 58, said bars being secured to the said triangular frame in spaced relation, substantially as shown in Fig. 7. The trip and detent arrangement for the scoops are similar to that heretofore described, except there are three arms rotatable with the shaft to correspond with the said three scoop arrangement as shown in Fig. 8.

In Figs. 9 and 10 is shown a modified method for the construction of the trip and detent control, in which one bar of said bars 23 is employed, on which is trunnioned the shaft 21 having a similar sprocket wheel and chain carried thereby, and the said shaft has a disk structure 59 secured thereto, there being a sector portion of the disk removed, the line of sever being straight as at J. The terminating ends of said straight portion will function in the disk rotation as engaging and releasing means for arms 60 that are secured to said shaft 8 by bolts 61. Each outer end of said arms has a roller 62 trunnioned thereon to rotate on the circular portion of said disk, which is the detent period of time, and when released the said arms are free to rotate with said scoops as turned by shaft 8. The dotted lines K in Fig. 10 show the position of one arm at the time of its release while the next succeeding movement of the other arm will contact peripherally of said disk which, in its consecutive order, will be released in like manner but momentarily retain the scoops stationarily as the machine moves forward, and such other modifications may be employed as lie within the scope of the appended claims.

Having fully described our invention what we claim as new and desire to secure by Letters Patent is:

1. In an agricultural machine, in combination, a frame having a rectangular portion comprised of bars spaced apart in parallelism and transversely positioned bars secured thereto and extending rearward, a shaft trunnioned adjacent the rear ends of last said bars, the shaft having scoops secured thereto, spaced therealong and extending oppositely therefrom, a pair of arms secured to the shaft and oppositely extending therefrom to control interval rotation of the shaft as dumping means for the scoops, a pair of bars secured to the frame intermediate of its length, the bars converging outward so that the ends will engage and being secured together, and a hitch to connect the machine to motive power, a wheel positioned between the converging bars and being trunnioned thereto through the medium of an axle for the wheel, a sprocket secured to the axle adjacent the wheel, a pair of bars spaced apart in parallelism and being secured to the rectangular portion of the frame centrally of its ends, said bars being in parallelism with the implement's line of travel and with the sides of said wheel, another sprocket wheel having a shaft and means to trunnion the shaft to the forward end of the last said parallel bars, said sprocket being aligned with the first said sprocket, a chain connecting said sprockets, a lug secured to said other sprocket shaft, radially extending therefrom and rotatable therewith, an arm rockably carried between said parallel bars, one end of which rests on the frame in working relation to the lug and rocked upward thereby at each rotation of the lug element, a pawl, one end of which is pivotally carried between and adjacent the rear ends of the last named parallel bars, a link pivotally connected to the free ends of the pawl and last said arm respectively, a spring to raise the link whereby the last said arm is rocked to seat on the frame and the pawl being rocked upward and rearward to its normal stationary position as a detent for alternate engagement of the first said arms to control the engagement of the scoops with the ground alternately as the implement moves forward, a wheel and a telescopic shank to carry each end of the frame, and a screw for each shank to raise and lower the frame.

2. In a scoop for an agricultural machine as described, the scoop comprised of a bottom and diverging side walls upward from the bottom and a pair of jaws for each divergent wall of the scoop at their upper extremities as securing means for the scoop to a shaft, the forward end of the scoop bottom having an arcuate inner cut to align a mulch of the earth as the scoop moves forward and the converging sides to conform to the sides of a furrow collecting earth therefrom to load the scoop at short intervals of its movement.

HARRY S. AUSHERMAN.
WILLIAM S. AUSHERMAN.